United States Patent
Kramer et al.

(10) Patent No.: US 8,395,040 B1
(45) Date of Patent: Mar. 12, 2013

(54) METHODS AND SYSTEMS TO PROCESS INPUT OF STRINGED INSTRUMENTS

(75) Inventors: Marcus Kramer, San Diego, CA (US); Bhishan Hemrajani, Irvine, CA (US); Benjamin Pezzner, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 262 days.

(21) Appl. No.: 12/361,493

(22) Filed: Jan. 28, 2009

Related U.S. Application Data

(60) Provisional application No. 61/024,145, filed on Jan. 28, 2008.

(51) Int. Cl.
  *G10H 1/18* (2006.01)
  *G10H 3/10* (2006.01)

(52) U.S. Cl. ............... 84/733; 84/643; 84/646; 84/743

(58) Field of Classification Search ............ 84/733
  See application file for complete search history.

(56) References Cited

U.S. PATENT DOCUMENTS

| | | | |
|---|---|---|---|
| 3,662,641 A * | 5/1972 | Allen et al. | 84/722 |
| 4,339,979 A * | 7/1982 | Norman | 84/627 |
| 4,658,690 A * | 4/1987 | Aitken et al. | 84/629 |
| 4,791,848 A | 12/1988 | Blum, Jr. | |
| 4,901,618 A * | 2/1990 | Blum, Jr. | 84/453 |
| 4,951,545 A * | 8/1990 | Yoshida | 84/646 |
| 5,085,119 A * | 2/1992 | Cole | 84/724 |
| 5,121,668 A * | 6/1992 | Segan et al. | 84/646 |
| 5,237,126 A * | 8/1993 | Curtis et al. | 84/724 |
| 5,398,585 A | 3/1995 | Starr | |
| 5,557,057 A | 9/1996 | Starr | |
| 5,777,251 A * | 7/1998 | Hotta et al. | 84/609 |
| 5,844,506 A | 12/1998 | Binstead | |
| 6,792,120 B1 | 9/2004 | Szenics | |
| 6,822,156 B1 | 11/2004 | Lazarus et al. | |
| 6,852,919 B2 | 2/2005 | Ludwig | |
| 6,967,277 B2 | 11/2005 | Querfurth | |
| 6,995,310 B1 | 2/2006 | Knapp et al. | |
| 7,038,123 B2 | 5/2006 | Ludwig | |
| 7,408,109 B1 | 8/2008 | Freitas | |
| 2004/0255763 A1 | 12/2004 | Baggs | |
| 2005/0126373 A1 | 6/2005 | Ludwig | |
| 2006/0032364 A1 | 2/2006 | Ludwig | |
| 2006/0243123 A1 | 11/2006 | Ierymenko | |
| 2008/0028920 A1 | 2/2008 | Sullivan | |
| 2008/0236374 A1 * | 10/2008 | Kramer et al. | 84/733 |
| 2008/0271594 A1 | 11/2008 | Starr | |

OTHER PUBLICATIONS http://www.ezgear.com/GS/YouRockGuitarGallery.html.
http://www.fretlight.com/.
http://www.zivix.net/products.htm.
http://www.hasbro.com/media/default.cfm?page=release&release=524.
http://www.axon-technologies.net/modules.php?op=modload&name=News&file=article&sid=1&menu=101.
Korg KP3 Owner's Manual 2006.
USPTO Non-Final Rejection for U.S. Appl. No. 12/361,502, dated May 27, 2010; 7 pages.
USPTO Non-Final Rejection for U.S. Appl. No. 12/361,502, dated Nov. 8, 2010; 6 pages.
USPTO Non-Final Rejection for U.S. Appl. No. 12/361,502, dated Nov. 20, 2009; 10 pages.
USPTO Notice of Allowance for U.S. Appl. No. 12/361,502, dated Mar. 28, 2011; 7 pages.
USPTO Notice of Allowance for U.S. Appl. No. 12/361,502, dated Sep. 18, 2011; 5 pages.

* cited by examiner

*Primary Examiner* — Christopher Uhlir

(57) ABSTRACT

An embodiment of the present invention is directed to a method and system for electronic sensing of string instrument input. The method includes receiving a first signal from a peak detection circuit. The peak detection circuit is operable to sense string activation. A second signal is received from one or more capacitive sensors. The second signal may include finger placement information. The method further includes processing the first and the second signals to generate an audio signal and outputting the audio signal.

19 Claims, 8 Drawing Sheets

METHODS AND SYSTEMS TO PROCESS INPUT OF STRINGED INSTRUMENTS

RELATED U.S. APPLICATIONS

This application claims the benefit of and priority to the copending provisional patent application Ser. No. 61/024,145, entitled "System and Method for Electronic Sensing for Stringed Instruments," with filing date Jan. 28, 2008, and hereby incorporated by reference in its entirety.

TECHNICAL FIELD

Embodiments of the present invention generally relate to capacitive sensor based devices.

BACKGROUND

Certain string instruments, such as a guitar, can be difficult for beginners due to hand, wrist, and finger pain caused by the pressure required to hold the string down to form chords. The discomfort is sensed until the beginner develops the necessary toughness in his or her hand muscles and finger tips to overcome the pain. This can often be the limiting factor on beginners continuing to play the instrument.

Some conventional approaches to solving the aforementioned problem have provided a relatively pain free experience but do not provide a realistic experience nor allow a user to learn real instrument skills. For example, certain devices have replaced the strings with push buttons which do not provide a realistic experience nor teach the user how to play a real string instrument, such as a guitar.

SUMMARY OF THE INVENTION

Embodiments of the present invention provide a way for electronically sensing (e.g., via capacitive sensors) finger placement and string activation for producing an audio signal for output. A realistic playing experience is facilitated while avoiding the pain associated with the learning of a real instrument. Embodiments of the present invention are well suited for use in education, providing means for interactive instruction, music composition, and recording.

An embodiment of the present invention is directed to a method and system for electronic sensing of a string instrument's input. The method includes receiving a first signal from a peak detection circuit. The peak detection circuit is operable to sense string activation (e.g., strumming). A second signal is received from one or more capacitive sensors. The second signal may include finger placement information. A third signal may be received from a whammy bar or tremolo device. The method further includes processing the first, second, and third signals to generate an audio signal and outputting the audio signal. The processing may include detection of various tone modification techniques including, but not limited to, pitch bends, vibrato, pizzicato, harmonics, hammer-ons, pull-offs, slides, and various plucking nuances.

Another embodiment of the present invention is directed to an audio rendering apparatus. The audio rendering apparatus includes a plurality of capacitive sensors operable for sensing finger placement and movement and a plurality of lighting elements each operable to light an area corresponding to a respective capacitive sensor of the plurality of capacitive sensors. The audio rendering apparatus further includes a processing element operable to receive signals from the plurality of capacitive sensors and control the plurality of lighting elements, wherein the processing element is further operable to generate an audio signal based on the signals from the plurality of capacitive sensors.

DETAILED DESCRIPTION

Figure 1:
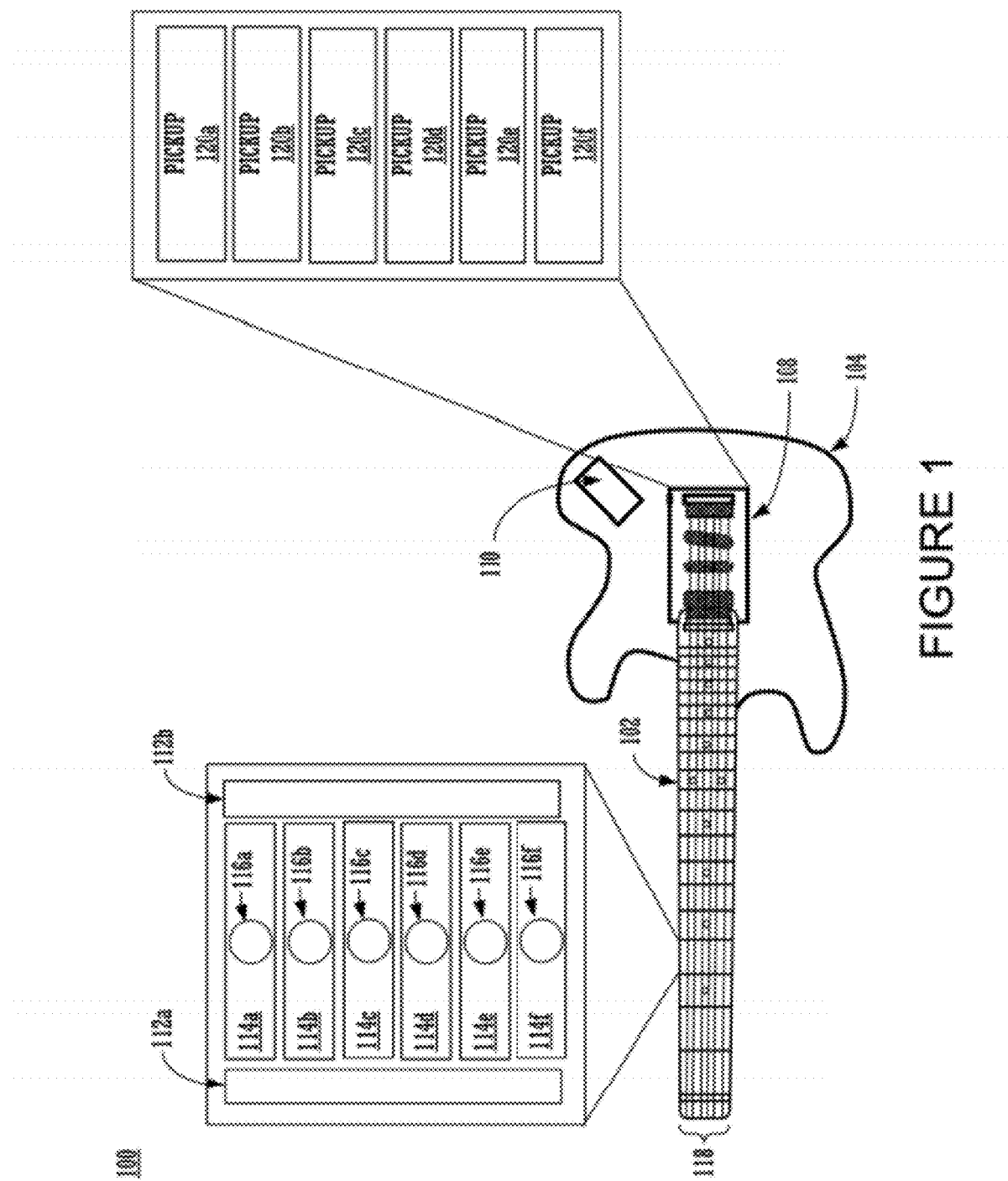
FIG. 1 shows a block diagram of an exemplary audio system, in accordance with one embodiment of the present invention.

Reference will now be made in detail to embodiments of the claimed subject matter, examples of which are illustrated in the accompanying drawings. While the invention will be described in conjunction with embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Embodiments of the present invention may include a variety of variations including, but not limited to, stringless, short string, or stringed instrument variations. As described herein, it is understood that stringless and short string versions may not have strings positioned over capacitive sensing areas on portions of the instrument neck but still have locations where strings would be located if strings were used. A short string embodiment may have a string free neck with strings only in the strumming area. A stringed embodiment may be substantially similar to a standard guitar but have capacitive sensing elements for determining, among other things, where the fingers are placed and thereby facilitating accurate audio signal generation (e.g., MIDI). The capacitive sensing elements are operable to sense portions of a player's finger that surround a string being held down thereby coming in contact with the capacitive sensors, as well as the proximity of the portion of the player's finger above the string. Thus, the use of the term string or strings herein is not to be limited to actual strings but to also be understood to apply to string positions or other locations and concepts where strings would be used in a stringed instrument design. It is further appreciated that embodiments of the present invention may include a variety of string instruments including, but not limited to, guitars (e.g., bass, acoustic, or electric), violins, violas, cellos, and banjos. It is also appreciated that embodiments of the present invention may include any number of strings or portions of strings including, but not limited to, four strings, five strings, six strings, seven strings, eight strings, nine strings, ten strings, or twelve strings.

Example Systems

FIGS. 1, 2, 4, and 5 illustrate example components used by various embodiments of the present invention. Although specific components are disclosed in systems 100, 200, 400, and 500 it should be appreciated that such components are examples. That is, embodiments of the present invention are well suited to having various other components or variations of the components recited in systems 100, 200, 400, and 500. It is appreciated that the components in systems 100, 200, 400, and 500 may operate with other components than those presented, and that not all of the components of systems 100, 200, 400, and 500 may be used to achieve the goals of systems 100, 200, 400, and 500.

Further, systems 100, 200, 400, and 500 include components or modules that, in various embodiments, are carried out by software, e.g., a processor under the control of computer-readable and computer-executable instructions. The computer-readable and computer-executable instructions reside, for example, in data storage features such as computer usable memory, removable storage, and/or non-removable storage. The computer-readable and computer-executable instructions are used to control or operate in conjunction with, for example, a processing unit. It should be appreciated that the aforementioned components of systems 100, 200, 400, and 500 can be implemented in hardware or software or in a combination of both.

FIG. 1 shows block diagram of an exemplary audio system or instrument, in accordance with one embodiment of the present invention. System 100 includes neck portion 102, body portion 104, processing module 106, string activation area 108, and tremolo area 110. Neck portion 102 includes frets 112a and 112b, capacitive sensors 114a-f, lighting elements 116a-f, and optional strings 118. System 100 may be a plurality of devices including, but not limited to, an audio apparatus, a musical apparatus, a guitar or an audio system for electronic sensing in a stringed instrument.

Neck portion 102 includes a plurality of capacitive sensors operable to sense or detect finger placement and movement sensed during instrument interaction by a player. In one embodiment, the plurality of capacitive sensors includes one capacitive sensor element per string per fret. In another embodiment, the plurality of capacitive sensors includes one capacitive sensor slider element per string for substantially the length of the string. In another embodiment, the plurality of capacitive sensors can be configured in a track pad style (e.g., sensors for sensing motion patterns) for substantially the length of neck portion 102. As described herein, the plurality of capacitive sensors may comprise overlapping sensing areas (e.g., between neighboring strings) thereby improving detection based on capacitive sensor output. In addition, as described herein, the plurality of capacitive sensors may be unevenly spaced (e.g., corresponding to varying fret spacing).

Neck portion 102 may further include a plurality of lighting elements (e.g., lighting elements 116a-f) operable to each light or backlight an area corresponding to each of the plurality of capacitive sensors. The plurality of lighting elements may thus be operable to light a portion of the fingerboard corresponding to a portion of at least one capacitive sensor. The lighting elements may further be operable to discreetly light a portion corresponding to a string of a guitar or other stringed instrument. Each of the plurality of lighting elements (e.g., lighting elements 116a-f) may be coupled to each of the plurality of capacitive elements (e.g., 114a-f), respectively. As described herein, the circuits for implementing the plurality of capacitive sensors may be integrated with each of the plurality of lighting elements, such that the plurality of capacitive sensors and the plurality of lighting elements are operable to be controlled in a multiplexed manner.

As mentioned above, portions of neck portion 102 may include a fingerboard. The plurality of lighting elements and the plurality of capacitive sensors may be coupled to a surface of the fingerboard. The surface of the fingerboard may comprise printed circuit board (PCB) material. In one embodiment, the fingerboard comprises FR4 (flame retardant 4) PCB material. For example, the fingerboard can be constructed of PCB material containing capacitive sensing traces. The playing surface of the fingerboard can be the PCB itself, instead of adding a veneer on top of the PCB thereby maximizing the sensitivity and simplifying the construction of a capacitive sensing instrument neck portion. The use of PCB material can provide areas for the lighting elements (e.g., light emitting diodes (LEDs)) to shine through (e.g., translucent portions).

In one embodiment, an appropriate solder mask color can be used to obscure the traces and make the neck more visually appealing or even mimic the appearance of a conventional wood fingerboard. PCB silk-screening can also be used to create various types of finger guides on the neck (e.g., to indicate virtual string positions) regardless of whether the capacitive sensing instrument uses strings. Silk-screening can further be used to label the surface thereby allowing custom graphic selection, and solder masking customization can be used to allow custom color selection. In addition, the shape of the PCB can mimic that of an actual fingerboard so that it blends directly into the overall instrument body.

The fingerboard may further include frets wires (e.g., 112a-b). In one embodiment, slots can be routed in the PCB fingerboard at each fret position thereby allowing ready attachment of frets directly to the PCB without requiring the PCB to be split for each fret position. More specifically, a small portion of the fret wire's barb may be cut out of the middle section of the fret wire to accommodate a narrow area on the PCB to allow signals to cross between fret positions. For example, the middle of each fret may be removed thus allowing signals to cross through each fret and down neck portion 102. It is appreciated that the fret wires may also facilitate a more realistic feel on stringless, short string, and stringed instruments.

The fingerboard may comprise a plurality of layers. In one embodiment, a first layer housing the plurality of capacitive sensors and capacitive signaling lines is used while a second layer is used to remove issues of signal routing and noise. The second PCB allows for more room for signal routing without having an impact on capacitive sensing. The two PCB layers can be sandwiched together with a variety of low profile headers, spaced along the length of the neck in order to optimize the signal routing between the capacitive sensing elements and sensing processing elements. The first PCB may include capacitive sensors and corresponding LEDs, while the second PCB contains processing elements. This allows the first PCB to have low signal to noise ratio (SNR). In another embodiment, the second PCB may include LEDs in addition to the processing elements to allow for heavy duty signal routing, which minimizes noise on the sensing PCB.

The plurality of capacitive sensors may further be designed to improve the Signal to Noise Ratio (SNR) of capacitive sensor readings. In one embodiment, the design of the capacitive sensing elements on neck portion 102 of an instrument is both functional and aesthetic. The design can be functional to provide optimum SNR as well as provide for LED backlighting. The design can be aesthetic to provide a pattern that follows the shape of the neck of the instrument, as well as a visual indication of where the musician should place his or her fingers on the neck.

The plurality of capacitive sensing elements may be unevenly spaced across neck portion 102. In one embodiment, since a guitar neck has a taper as well as unevenly spaced frets, the capacitive sensing elements may be designed to conform to the conventional spacing of the frets and the taper of the neck thereby providing a very accurate and realistic playing experience in line with traditional guitars. For example, for a 21 fret guitar neck each possible finger position, no two capacitive sensing elements may have substantially the same shape and size. The successive frets get narrower and narrower traversing down the neck causing each two fret positions to have substantially different geometry for each of the capacitive sensors. That is, the length and width of the fret positions vary due to the taper of the neck of the guitar due to the strings fanning out as the strings approach the body of the guitar. It is appreciated that capacitive sensors are well suited for matching the geometry to give a realistic playing experience.

It is appreciated that the use of capacitive sensors can allow designs outside of the traditional geometry since designs are not limited by the physical acoustic requirements (e.g., of strings) that limit traditional instrument (e.g., guitar) designs. For example, the areas of neck portion 102 can thus be wider, narrower, substantially similar size or an irregular shape as desired for aesthetic and design purposes.

System 100 of FIG. 1 further includes body portion 104 comprising a strumming area or string activation area. As described herein, string activation area may include strings substantially similar to conventional stringed instrument strings or optical sensors.

Body portion 104 includes electronic processing module 106. It is appreciated that a portion or substantial portions of processing module 106 may be distributed between neck portion 102 and body portion 104 as determined by design. Processing module 106 may be a variety of processing devices including, but not limited to, a central processing unit (CPU) or a microcontroller. Processing module 106 or element may be operable to receive signals from the plurality of capacitive sensors and string activation area 108 to produce an audio signal and control the plurality of lighting elements. String activation area 108 includes pickups 120a-f operable for detecting strumming. In one embodiment, pickups 120a-f may be capacitive sensors, as described herein. In another embodiment, pickups 120a-f may be optical sensors, as described herein.

Processing module 106 is operable to provide signals from the plurality of capacitive sensors for generating an audio signal (e.g., to a MIDI output generator). In one embodiment, processing module 106 is further operable to communicate with the plurality of capacitive sensors and the plurality of lighting elements to respond to each in a time multiplexed manner.

In one embodiment, processing module 106 is operable to control the plurality of lighting elements based on a signal received from a computing device (e.g., a Musical Instrument Digital Interface (MIDI) signal). For example, the plurality of lighting elements via processing module 106 may be operable to be configured to light a finger placement according to a song to be played based on a signal received from the computing device. For example, the received MIDI messages can be decoded by processing module 106 to activate the lighting elements (e.g., LEDs) for appropriate finger positions to create the encoded note(s) or chord(s).

It is appreciated that the use of a standard signal (e.g., MIDI) allows compatibility with numerous pieces of already existing content. For example, MIDI songs may be downloaded from internet and used to learn how to play on the instrument by following along with the LEDs in real-time guiding the player to the proper finger positions and note timing. The ability to interact with a computer device (or other MIDI device) facilitates use of software applications to assist in educating a player. For example, the software may receive information of where the player is placing his or her fingers and thus analyze the player's performance in real-time. The software may thus show the user where his or her fingers are to be placed and where he or she is actually placing his or her fingers on a display. The software may further wait for a player to get chord(s) or note(s) correct before proceeding (e.g., to the next chord or note).

In one embodiment, system 100 may include strings which comprise a nylon portion and a metal portion (e.g., metal windings) corresponding to a pick up area. The metal windings can continue over the bridge in order to help maintain the sounds of a metal string guitar versus a full nylon string guitar. The nylon portion may substantially correspond to neck portion 102 for better finger interaction. It is appreciated that the use of nylon strings is typically less painful on the fingers a player. The string may be made out of nylon with metal wrapped over the portion of string in the plucking area. The strings vibrations may then be detected via conventional electromagnetic guitar pickups while allowing the length of the string that spans the fingerboard (or neck portion 102) to be nylon which causes less pain to the player. In another embodiment, the nylon string portion can also be made thicker and/or oval shaped over the fingerboard span and can return to a normal thin core with metal windings over the electronic pickups to further help reduce discomfort.

Body portion 104 may further include tremolo area 110. In one embodiment, notes can be altered by audio signal processing techniques within the electronics of the instrument (e.g., via processing module 106) to reflect tremolo input. For example, the tones can be altered by modifying MIDI messages generated by the instrument.

In one embodiment, tremolo area 110 includes a plurality of capacitive sensors operable to receive tremolo bar input. Tremolo area 110 uses a plurality of capacitive sensor elements to substitute for the tremolo bar to provide similar or additional functionality. It is appreciated that the capacitive sensor based tremolo area 110 may be located anywhere and is not restricted to the traditional tremolo bar location. For example, the tremolo area 110 can be placed in two locations so it can be operated by either hand. The location of tremolo area 110 may also allow the player to continue strumming or plucking the strings while notes are bent with his or her opposite hand or another part of his or her body (e.g., hip or leg).

In one embodiment, tremolo area 110 is a one dimensional (1-D) linear slider such that the player's finger can be slide along tremolo area 110 to proportionally alter the pitches of the tones generated. In another embodiment, the tremolo bar may be arranged as a two dimensional (2-D) sensor thereby allowing the user to alter the tones generated in more sophisticated ways than simply bending the note. For example, sliding the user's finger in one axis can alter pitch, while sliding in the other axis can alter other effects (e.g., vibrato, reverb, distortion, or any other method of modifying audio tones).

Figure 2:
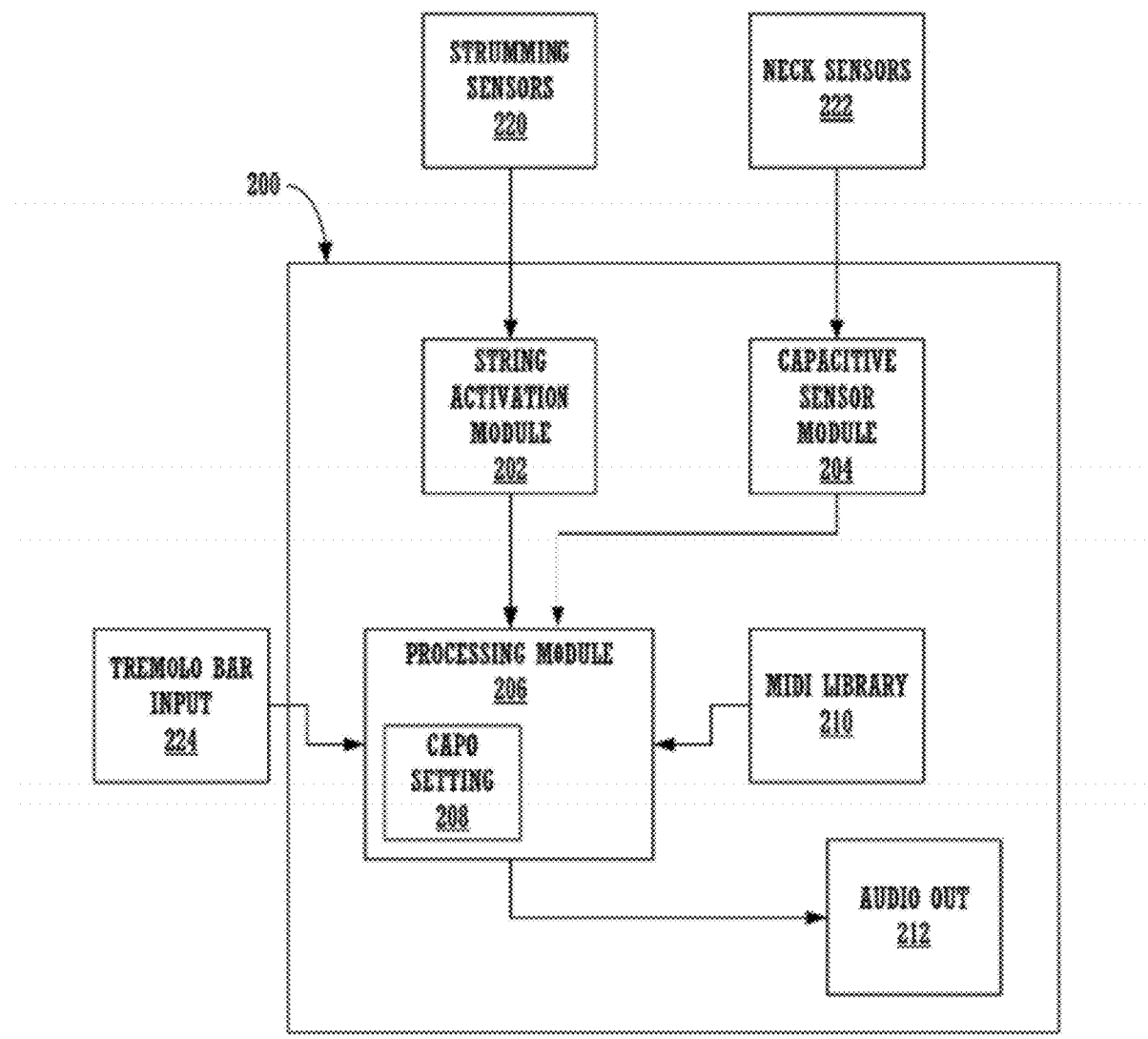
FIG. 2 shows a block diagram of an exemplary system, in accordance with one embodiment of the present invention.

FIG. 2 shows a block diagram of an exemplary electronic system, in accordance with one embodiment of the present invention. System 200 includes string activation module 202, capacitive sensor 204, and processing module 206. In one embodiment, system 200 is a system for electronic sensing in a stringed instrument. System 200 is coupled to strumming sensors 220, neck sensors 222, and tremolo bar input 224. As described herein, strumming sensors 220 may be a variety of sensors including, but not limited to, capacitance sensors, optical sensors, or magnetic sensors (e.g., pickups 120a-f). Neck sensors 222 provide capacitive sensor measurements system 200 (e.g., capacitive sensor module 204). Tremolo bar input 224 provide tremolo input (e.g., tremolo input area 110).

String activation module 202 senses string activation. In one embodiment, string activation module 202 may sense string activation of traditional style guitar strings. In another embodiment, string activation module 202 is operable to detect string activation optically. That is, optical sensors may be used to detect strumming or plucking without the use of strings. For example, dragging one's thumb across a string activation area as if strumming guitar strings, the optical sensors will pick up what the finger is touching, what is being strummed, and how fast it is moving across the sensors. Optical sensors further facilitate detection of motion in a parallel direction to the string which can be configured to generate different tones or to alter the tones generated.

Optical sensors may further be used to detect strumming based on proximity (e.g., detect if the person touched an area or if they are up a few millimeters) and force. For example, a low resolution image sensor may be used for each string to detect the movement and speed of the player's fingers. The optical sensors may be located in the body of the instrument (e.g., a position substantially similar to where magnetic pickups are located or where a player naturally strums his or her fingers). The sensors may use image correlation techniques or laser speckle techniques to detect and analyze the finger motion of the player as his or her fingers move through the normal strumming area. It is appreciated that the use of optical sensors allow users to play the instruments without finger pain from strumming or picking strings with bare fingers, and thereby facilitates rapid learning and faster playing techniques.

String activation module 202 may sense string activation via the capacitive sensors located under the strumming area of the strings. Capacitive sensing can be used instead of a traditional electromagnetic pickup for detecting the vibration of metallic instrument strings or portions thereof. For example, a narrow capacitive sensing element can be embedded in the guitar (e.g., towards the base of the neck and near the bridge) so that the distance between the string and the sensing element is minimized for increased sensitivity during strumming. A circuit may be used to monitor the sensors to detect variations in the capacitance that results from the metal string portion oscillating near each capacitive sensor element. The movement of the metal string near the capacitive sensor element will modify the capacitance of the sensing element itself, causing the sensing circuit to detect a change in capacitance. In one embodiment, there is one capacitive sensing element for each string.

Capacitive sensing of the strings is an economical solution with the sensors integrated into the neck (e.g., neck portion 102), so that the neck contains substantially all sensing electronics for sensing finger position with capacitive sensing as well as the sensing for strumming/plucking with capacitive sensors. It is appreciated that the use of capacitive sensing elements allows relatively shallow and small sensors as compared to conventional pickups (e.g., routing channels for the pickups and wiring).

In one embodiment, the capacitive sensors can be used with a plurality of nylon strings where a portion of each nylon string including metal windings that are in close proximity to the capacitive sensor. The use of nylon strings thus allows acoustic guitars to have a simple technique for electronic detection of string vibrations while maintaining the sound of nylon strings.

Capacitive sensor module 204 capacitively senses finger positions during play. As described herein, the neck (e.g., neck portion 102) may include a plurality of capacitive sensors which capacitive sensor module 204 used to sense finger positions and provide the capacitive sensor readings to processing module 206.

Processing module 206 receives signals from string activation module 202 and capacitive sensor module 204. Processing module 206 may further receive signals from a tremolo bar input device (e.g., tremolo area 110). Based on the signals received, processing module 206 is further operable to output an audio signal (e.g., MIDI signal).

In one embodiment, processing module 206 outputs an audio signal based on a capo setting. System 200 can be configured to have a virtual capo setting. The instrument via processing module 206 can alter the pitch produced by all strings or select individual strings. It is appreciated that the altering of pitch for select individual strings would not otherwise be possible with a conventional capo, since a conventional capo can only change each string by the same interval, whereas processing module 206 can change each individual string by an independent interval set by the user, allowing for easily programmable alternate tuning styles. In one embodiment, the alternation of pitch based on a virtual capo setting can be activated by a simple electronic input on the instrument, such as a button, knob, or display screen (e.g., LCD).

Processing module 206 is further operable to detect vibrato. Vibrato can be detected on a capacitive sensing instrument neck based on the varying pressure applied to a capacitive sensor. As a player's finger shakes, there will be a varying pressure applied to the capacitive sensor which can be detected as a varying capacitive signal which varies depending on how much of the surface area of the fingertip is pushed against the capacitive sensing surface. Vibrato may also be detected by monitoring variations between neighboring capacitive sensing elements on a fingerboard. As described herein, vibrato can also be detected by detecting invasion of neighboring strings, such that if a finger is shaking on string one it will be able to detect a faint amount of capacitive effect of the finger shaking an adjacent string.

Processing module 206 is also operable to detect pitch bend. Pitch bend may be detected by algorithmically reconfiguring the sensors on a fret (e.g., six or more sensors for a six string instrument) as a track pad to detect movement of the string and finger across the fret. For example, if a finger is put on string one and string one is plucked followed by a sensing of movement of the finger toward string two without string two being plucked, this can be recognized as bending the note instead of the finger being put on string two.

Figure 3A:
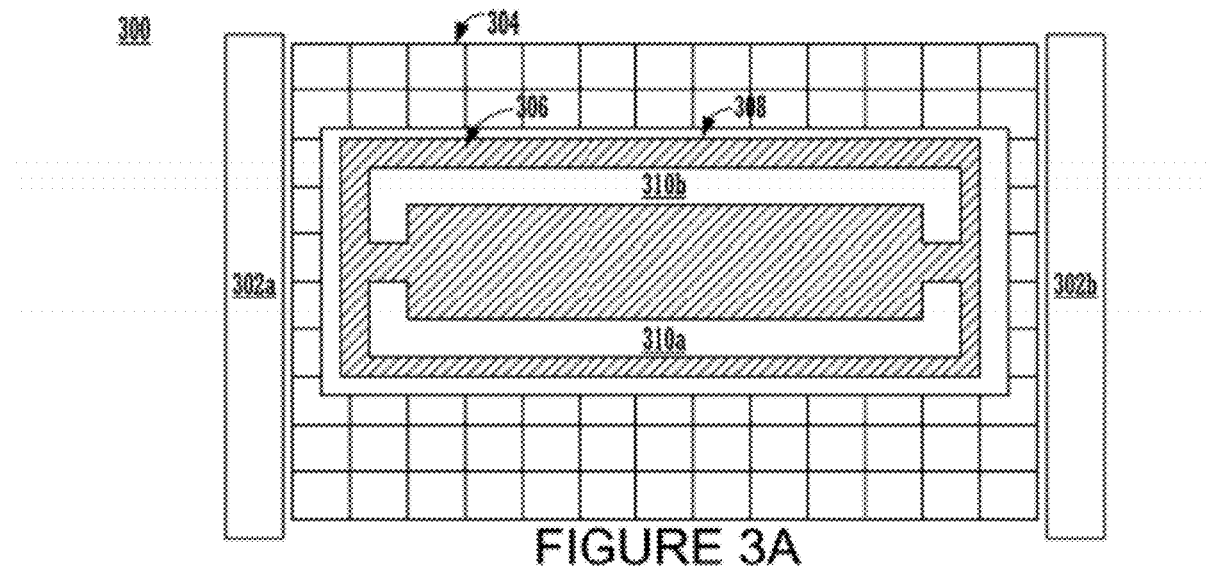
FIG. 3A shows a block diagram of a portion of an exemplary capacitive sensor layout, in accordance with one embodiment of the present invention.

FIG. 3A shows block diagram of a portion of an exemplary capacitive sensor layout, in accordance with one embodiment of the present invention. Capacitive sensor layout 300 includes frets 302a and 302b, grounding plane 304, spacing 308, and capacitive plate 306. Capacitive plate 306 includes translucent areas 310a and 310b. It is appreciated that translucent areas 310a-b can be shaped in a variety of shapes and increase or decrease in size, to facilitate desired back-lighting. Portion 300 may be replicated down the neck of the instrument.

Capacitive sensor layout 300 facilitates a player easily identifying the illuminated position from any reasonable angle of holding the instrument. For example, the player often does not look at the fingerboard from a perpendicular perspective and a conventionally illuminated simple LED can be easily hidden by the string and/or by the player's finger once he or she place his or her finger on the designated location.

Spacing 308 is the gap between the positive plate formed by plate 306 and ground plane 304. The actual capacitive coupling occurs between the outer rectangle of plate 306 with ground plane 304. The small distance between the two effectively creates two capacitive plates and as fingers comes near a secondary capacitive coupling is effectively created that will increase the capacitive coupling of two plates.

Areas 310a-b could have been filled with a metal (e.g., copper) to be part of capacitive plate 306 but areas 310a-b are carved out to allow light to shine through and to bracket substantially the entire fret. It is appreciated that light pipe or other lighting material may be used to ensure the fret is substantially bracketed by the backlight source. It is appreciated that the fret positions may change thus the width of capacitive plates and thereby lighting areas vary accordingly.

In one embodiment, a translucent material in areas 310a-b for the top layer of the instrument neck (e.g., FR4 PCB with a non-opaque solder-mask) is applied. The lighting elements (e.g., LEDs) may be mounted on the back side of the top PCB or mounted on a second PCB that is sandwiched against the top layer PCB from below. For example, rectangular areas in a PCB may have copper removed to allow LED backlighting of the rectangular area. This allows a relatively large illuminated area which cannot be easily covered with a finger, provides wide viewing angles, and provides a clear target of which string is indicated at a variety of viewing angles, since the rectangle brackets the designated string.

Figure 3B:
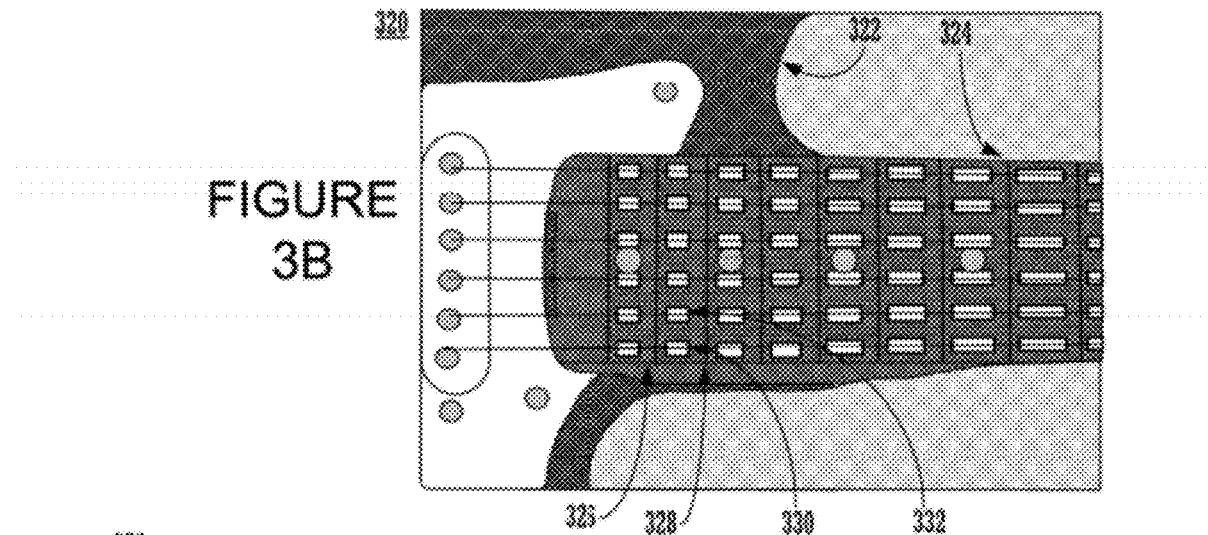
FIG. 3B shows a diagram of an exemplary backlight pattern on an instrument neck, in accordance with one embodiment of the present invention.

FIG. 3B shows a diagram of an exemplary backlight pattern on an instrument neck, in accordance with one embodiment of the present invention. Diagram 320 includes body portion 322 and neck portion 324. Body portion 322 and neck portion 324 are substantially similar to body portion 102 and body portion 104. Neck portion 324 includes fret 326 and 328 and exemplary backlighting patterns 330 and 332. It is appreciated that backlighting patterns 330 and 332 are substantially repeated on substantial portions of neck portion 324.

Figure 3C:
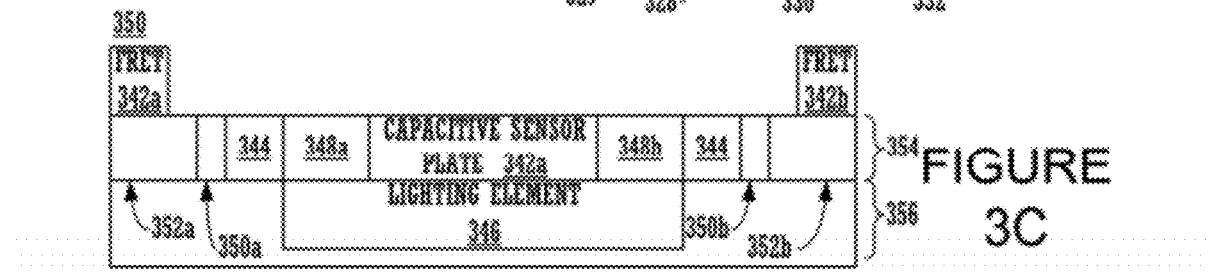
FIG. 3C shows a diagram of an exemplary cross section of a backlight pattern on an instrument neck, in accordance with one embodiment of the present invention.

FIG. 3C shows a diagram of an exemplary cross section of a backlight pattern on an instrument neck, in accordance with one embodiment of the present invention. Exemplary cross section 350 includes frets 342a-b, capacitive sensor plate 344, translucent portions 348a-b, lighting element 346, spacing 350a-b, ground plane portions 352a-b, first layer 354, and second layer 356.

Frets 342a-b divide up the areas of the instrument neck, as described herein. The capacitive coupling is formed via spacing 350a-b formed between capacitive sensor plate 344 and ground plate portions 352a-b. Lighting element 346 provides light via translucent portions 348a-b to the top of the neck of the instrument. In one embodiment, first layer 354 and second layer 356 may be PCBs, as described herein.

Figure 4:
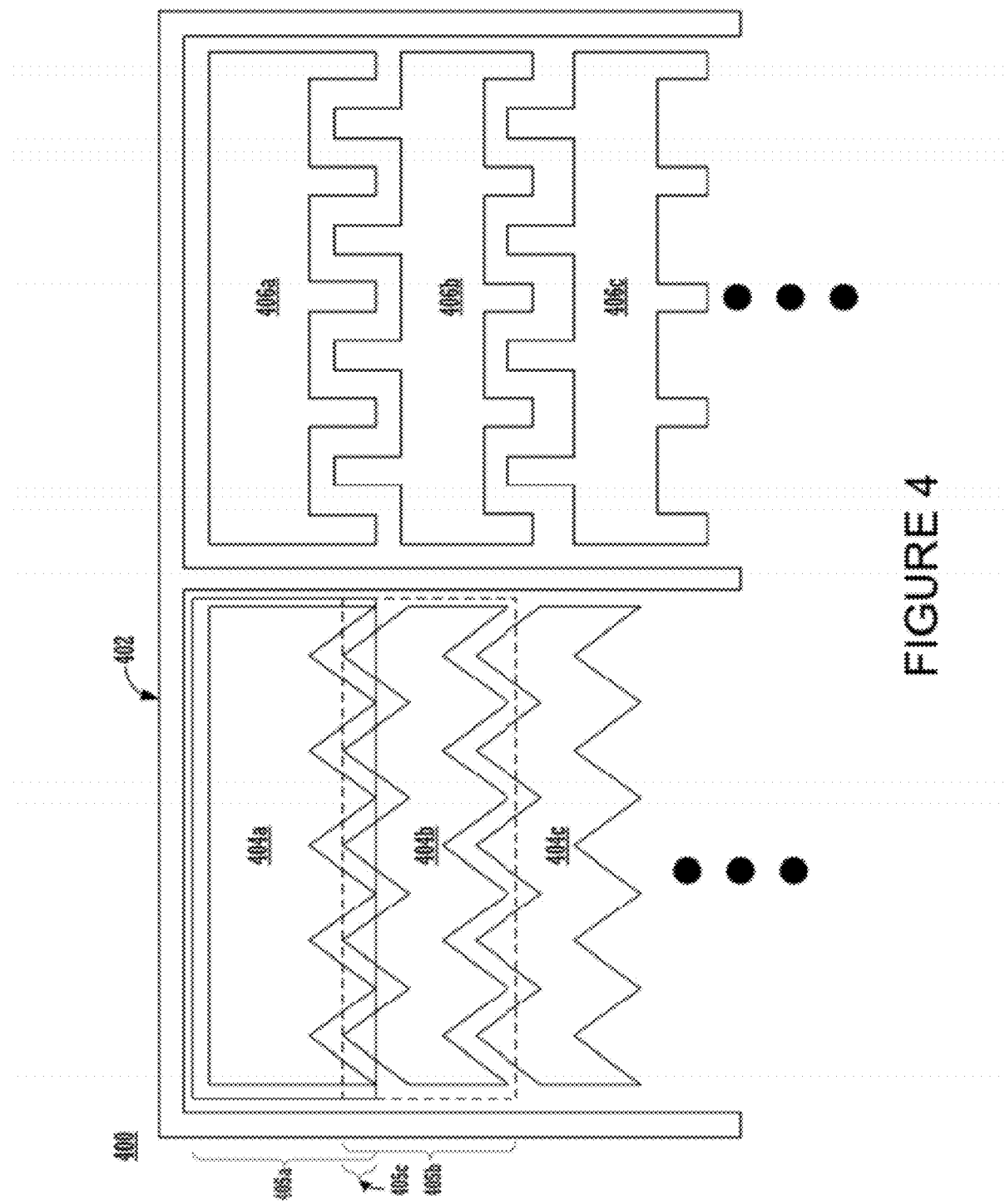
FIG. 4 shows a block diagram of a portion of an exemplary capacitive sensor layout, in accordance with another embodiment of the present invention.

FIG. 4 shows block diagram of a portion of an exemplary capacitive sensor layout, in accordance with another embodiment of the present invention. Capacitive sensor layout 400 includes ground plane 402, sensing elements 404a-c, sensing elements 406a-c, and sensing areas 405a-b. Sensing elements 404a-c and 406a-c illustrate different layouts of overlapping patterns capacitive sensing elements. Sensing area 405a corresponds to sensing element 404a. Sensing area 405b corresponds to sensing element 404a. Sensing areas 405a and 405b overlap in sensing area 405c.

Capacitive sensor layout 400 uses neighboring capacitive sensor elements to detect the relative position of a finger between the two elements. In order to more accurately sense finger placement on a capacitive sensing fingerboard, the capacitive sensing elements can have overlapping or adjacent regions between neighboring strings, instead of shielding each sensing element with a ground plane for each string and each fret. Neighboring string's capacitive sensors will thus register some portion of capacitive change when a finger is placed on a neighboring string. The capacitive measurements of the neighboring sensors can then be analyzed for the relative change in capacitance for neighboring strings to determine if the player is intending to hold down a single string or multiple neighboring strings. This facilitates reduction in false triggering of neighboring strings and improved sensing for various forms of vibrato and pitch bends. The overlapping sensors further allow a more subtle transitional effect to be measured which can be useful for detecting various techniques including, but not limited to, vibrato and bending of the strings. For example, pitch bend can be detected based on the fingers starting to wander into the adjacent string position.

The sensing may be done by alternating sensing one element, while electrically grounding other elements such that the capacitor plate is substantially surrounded by ground on all four sides. For example, when sensing element 404a, sensing element 404b will be coupled to ground such that sensing element 404a is surrounded by ground to form two capacitive plates. When sensing element 404b, sensing elements 404a and 404c are coupled to ground to surround sensing element 404b by ground to form two capacitive plates. Sensing elements 406a-c may be configured in a substantially similar manner to sensing elements 404a-c for measuring capacitance.

Figure 5:
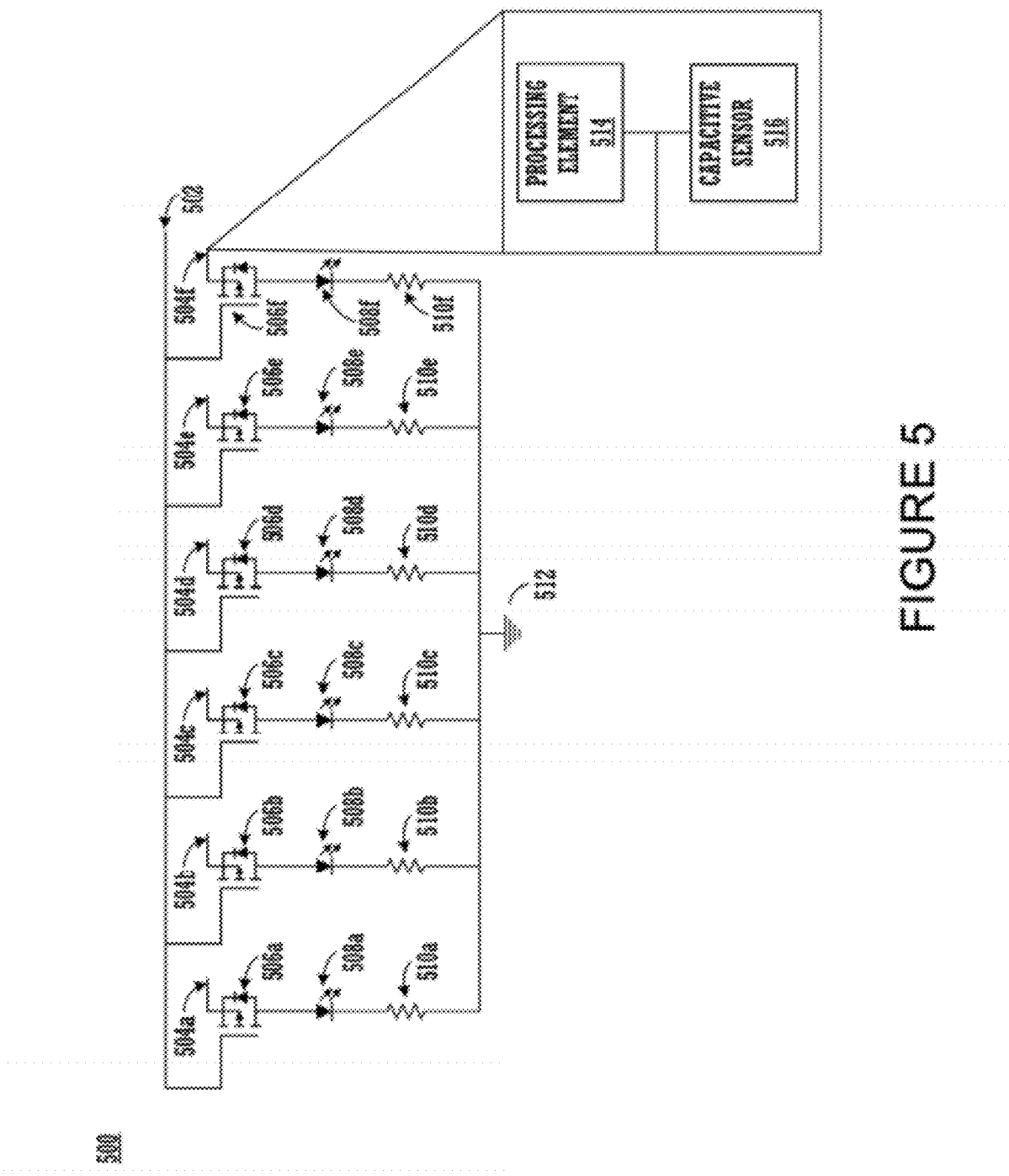
FIG. 5 shows a diagram of an exemplary circuit for time multiplexing capacitive sensors and lighting elements, in accordance with one embodiment of the present invention.

FIG. 5 shows a diagram of an exemplary circuit for time multiplexing capacitive sensors and lighting elements, in accordance with one embodiment of the present invention. In this way, the circuit traces can be shared to both provide capacitive sensing and light illumination. Circuit 500 includes lighting element control line 502, fret string connections 504a-f, switches 506a-f, lighting elements 508a-f, resistors 510a-f, and ground 512. Each of fret string connections 504a-f is coupled to a respective capacitive sensor and processing element 514. Circuit 500 thus allows lighting element 508a-f (e.g., LEDs) and corresponding capacitive sensors to be independently operated in time.

Circuit 500 illustrates a capacitive sensor and lighting element coupling for six strings in a single fret and embodiments of the present invention may have a circuit substantially to circuit 500 for each fret. The following discussion discusses the operation of switch 506f, lighting element 508f, capacitive sensor 516, and processing element 514. It is appreciated that lighting elements 508a-e and switches 506a-e may be controlled in a substantially similar manner to support substantially similar functionality.

When utilizing capacitive sensing elements to sense the finger positions on a string instrument finger board, lighting elements (e.g., LEDs) may be embedded at each position on the finger board in order to provide instruction or feedback to the musician (e.g., beginning musicians). Having lighting elements and capacitive sensors for each string position can result in numerous signaling routing situations if the traces are not shared. For example, with a guitar with six strings (or virtual strings) and twenty-one frets there will be a total of 126 traces for the capacitive sensors and another 126 traces for the lighting elements. In addition, six additional lighting elements may be used indicate an open string (e.g., in a top portion of the neck, such as the "nut" where the fingerboard meets the headstock). The resulting total is 258 signals, in this example, which need to be routed to a processing element for control.

Circuit 500 allows the time multiplexing of capacitive sensors and lighting elements thereby reducing the number of traces needed. For example, for a guitar with six strings (or virtual strings) and twenty-one frets there will be a total of 126 traces for both the capacitive sensors and the lighting elements. The six additional lighting elements indicating an open string result in a total of 132 traces, in this example. Thus, the ability to multiplex lighting elements and capacitive sensing elements results in substantial routing savings and signaling quality improvements.

Fret string connection 504f is coupled to corresponding capacitive sensor 516 and processing element 514. Fret string connection 504f is used to sense the capacitive element and control lighting element 508f. Processing element 514 may thus sense input from the capacitive sensor 516 and then switch over to illuminating of lighting element 508f in a time multiplexed fashion. That is, after a capacitive value has been read, the fret string connection 504f can be used as an output to drive a lighting element. Lighting element control line 502 can be used to enable or disable groups of switches when alternating between sensing mode and light drive mode. More specifically, the capacitive sensing elements may be polled sequentially and switches 506a-f can be reconfigured to drive a lighting element during the inactive portion of their sampling duty cycle. In one embodiment, the processing element 514 senses the capacitance for 1 millisecond and then repurposes the pin for 20-40 milliseconds to turn on or off a light element before sensing the capacitance again.

In one embodiment, switches 506a-f may be FETs with low parasitic capacitance to avoid adding parasitic capacitance to the sensing line by connecting an LED or FET to the same signal used to sense the capacitive input. Switches 506a-f may be high impedance field effect transistors (FETs) coupled such that when switch 506f is off, it has negligible effect on a measured capacitance (e.g., measured by capacitive sensor 516). When a FET of switches 506a-f is on, a lighting element (e.g., 508f) can be driven.

It is appreciated the circuit 500 has switches 506a-f coupled such that the drain controls whether a lighting element is driven. When the drain is coupled to high the lighting element may be driven on, while when the drain is coupled to low the lighting element is off. Lighting element control line 502 is used to control the gate of switches 506a-f.

It is appreciated that embodiments of the present invention may support or control multiple lighting elements (e.g., LEDs). In embodiment, multi-colored LEDs are used which are capable of at least five distinct colors through RGB elements in the LED. Colors may indicate which fingers should be placed in which position thereby avoiding confusion on certain cords. For example, each finger can correspond to a distinct color, such that the LEDs that make up a chord are illuminated in the proper color to indicate proper finger placement to create the chord. Color coding can further be used to indicate a special modification to a note. For example, if a certain finger is illuminated in blue, it could indicate to bend that node, red may indicate a hammer-on for that note, and green may indicate vibrato for that node.

Color may also be used to provide player feedback (e.g., if the player's fingers were misplaced when creating a chord). For example, the LEDs can be illuminated in white to indicate the desired finger positions, the LEDs where the fingers are correctly placed change to green while LEDs where the fingers are incorrectly placed can be illuminated red. In addition, the speed at which a note should be played or sustained can be indicated by color.

Figure 6:
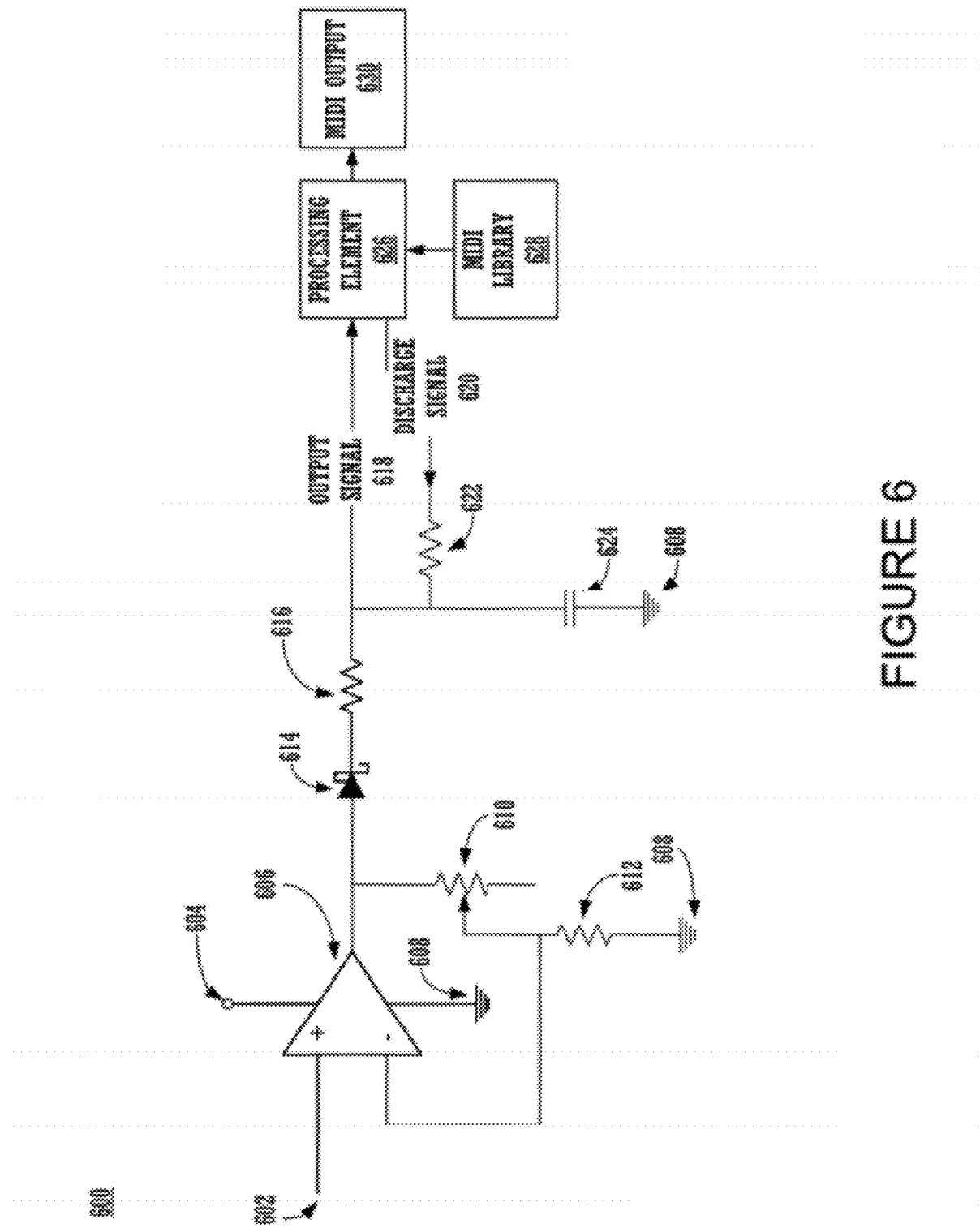
FIG. 6 shows an exemplary string activation circuit, in accordance with one embodiment of the present invention.

FIG. 6 shows an exemplary string activation circuit, in accordance with one embodiment of the present invention of processing module 206. String activation circuit 600 includes string input 602, Vcc signal 604, amplifier 606, ground 608, variable resistor 610, resistor 612, diode 614, resistor 616, output 618, discharge control 620, resistor 622, and capacitor 624. String activation circuit 600 is coupled to processing element 626. In one embodiment, circuit 600 is a peak detection circuit for string activation sensing. Circuit 600 provides an alternative means to sophisticated signal analysis to detect the characteristics of the note. Circuit 600 can be used in short string and stringed instrument versions for determining how the string was plucked, how loud, how fast, and when the string was muted or silenced.

Circuit 600 can provide both a fast charge time to detect string activation and a fast discharge/reset time in order to quickly and easily detect a change in string activation. It is appreciated that such a circuit in combination with capacitive finger position sensors may be used in place of digital signal processing (DSP) normally used to detect the pitch and string activation in existing MIDI guitars. Circuit 600 gathers information about string activation and filters out the pitch of activation in order to greatly simplify processing required to analyze the string activation.

The activation information to be obtained by circuit 600 from the signal is the attack, sustain, decay, and release (ASDR) profile. The attack portion is how hard and when did the string get hit. The decay portion is how the volume of the note tapers off. The sustain portion is how the note is resonating. The release portion is when was the string released or the note stops being played.

String input 602 is coupled to a string transducer (e.g., a piezo or electromagnetic sensor). In one embodiment, piezo electronic sensors are used to replace the bridge so that each string has its own sensor. Thus for a six string instrument, each of the six piezo sensors come into a circuit substantially similar to circuit 600.

Amplifier 606 amplifies the signal received via input 602 (e.g., from tens of millivolts to one or two volts). The amplified signal may then be processed by the subsequent components of circuit 600.

Diode 614 rectifies the signal from alternating current (AC) to direct current (DC). This ensures that negative voltages are not going to an ADC (analog to digital converter) of a processing element coupled to output 618.

Resistor 616 and capacitor 624 form a resistance/capacitance (RC) filter. Diode 614 in conjunction with resistor 616 and capacitor 624 result in a positive wave form swing which charges up the capacitor 624 to the peak voltage being received via input signal 602. Capacitor 624 thereby stores the charge where it can be sampled easily by a processing element.

Processing element 626 may thus sample the output voltage 618 at a relatively slow rate to determine the peak. Processing element 626 can then use the peak value sampled to determine the ADSR profile. The output signal from output voltage 618 can be used with fingering information from the capacitive sensors in the neck to accurately determine which string was hit and which tone was generated. MIDI library 628 can then be used by processing element 626 to generate MIDI output 630 based on the note being played by the fingers and the ADSR information.

In one embodiment, a simple 8-bit processor can detect the activation of multiple strings with low latency (e.g., <10 ms), since the detection is frequency independent. It is appreciated that oversampling is not needed as the frequency component is filtered out of the signal. It is appreciated that the capturing of MIDI information is simplified by capturing the critical elements instead of advanced signal processing.

After sampling the output voltage 618 and determining the peak, the processing element can then reset the circuit via discharge signal input 620.

When processing element 626 (e.g., microcontroller) pulls the output low of discharge signal 620, capacitor 624 discharges quickly. The discharge signal 620 may then be put into high impedance which allows the analog circuit to recharge capacitor 624. It is appreciated that there are a wide variety of other circuit solutions that can be used to periodically discharge the capacitor (e.g., timers, RC discharge).

The use of the microcontroller as processing element 626 allows the optimizing the latency of the system by immediately discharging/resetting the circuit as soon as it has sampled the peak value, so that the circuit is ready to react to any charge in the ASDR profile for subsequent sampling with minimal latency.

Figure 7:
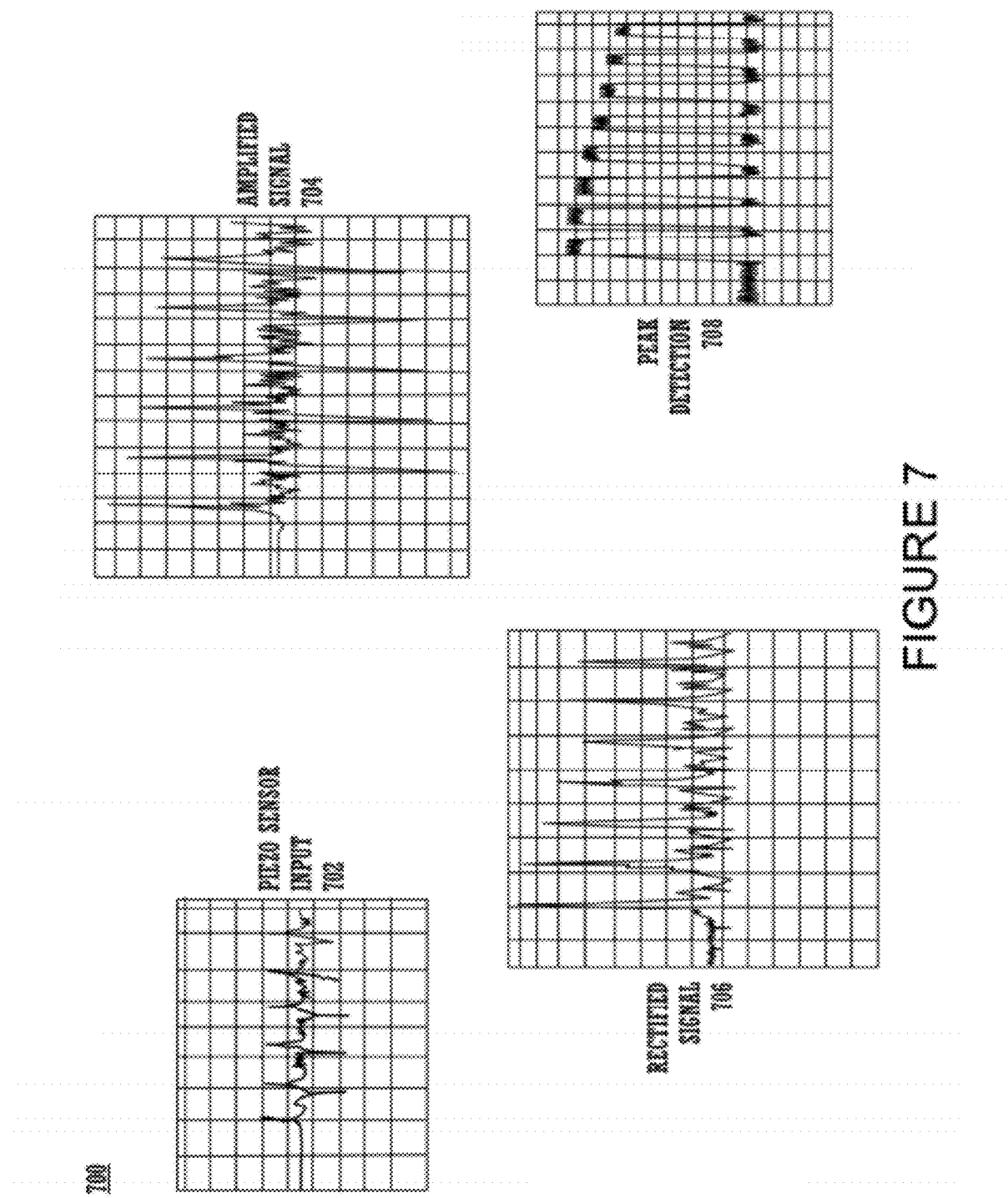
FIG. 7 shows exemplary graphs of signals handled by a string activation circuit, in accordance with one embodiment of the present invention.

FIG. 7 shows exemplary graphs of signals handled by a string activation circuit, in accordance with one embodiment of the present invention. Exemplary graphs 700 illustrate waveforms of signals as processed by a peak detection circuit (e.g., circuit 600). Exemplary graphs 700 include piezo sensor input 702, amplified signal 704, rectified signal 706, and peak detection 708.

Piezo sensor input 702 illustrates an exemplary signal that may be received by a peak detection circuit (e.g., via input 602). Amplified signal 704 illustrates the amplified version of the exemplary circuit input by an amplifier (e.g., amplifier 606) of a peak detection circuit. Rectified signal 706 illustrates the rectified version of the amplified exemplary signal output by a rectifier (e.g., diode 614) of a peak detection circuit. Peak detection 708 illustrates the output of a peak detection circuit (e.g., via output 618) for sampling by a processing element or microcontroller.

Example Operations

Figure 8:
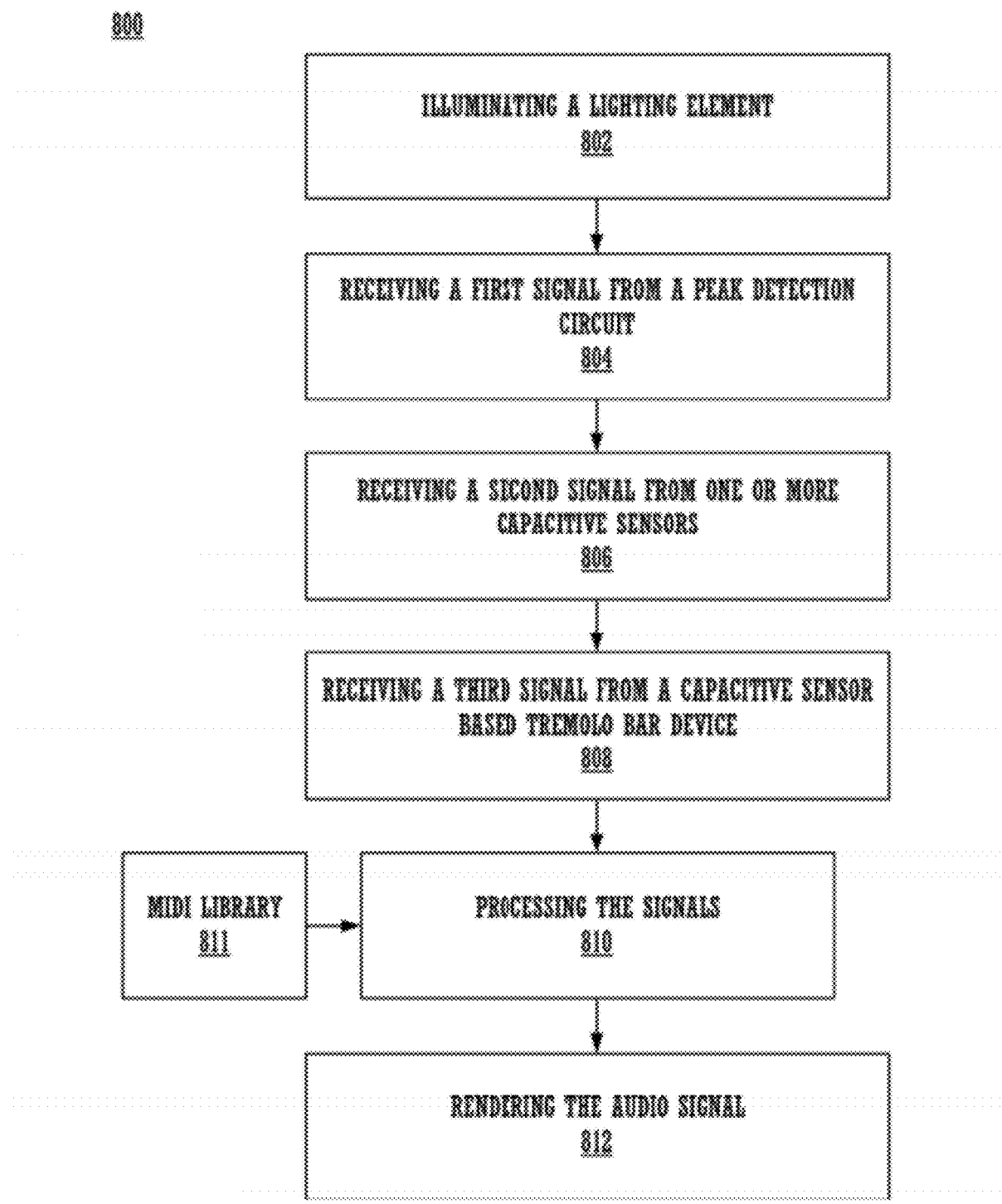
FIG. 8 shows a flowchart of an exemplary method for electronic sensing of stringed instrument inputs, in accordance with an embodiment of the present invention.

With reference to FIG. 8, exemplary flowchart 800 illustrates example blocks used by various embodiments of the present invention. Although specific blocks are disclosed in flowchart 800, such blocks are exemplary. That is, embodiments are well suited to performing various other blocks or variations of the blocks recited in flowchart 800. It is appreciated that the blocks in flowchart 800 may be performed in an order different than presented, and that not all of the blocks in flowchart 800 may be performed. Flowchart 800 includes processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 8 shows a flowchart of an exemplary method for electronic sensing of stringed instrument input, in accordance with an embodiment of the present invention. In particular, FIG. 8 shows a flowchart of an exemplary process for receiving and processing of finger placement and string activation signals, in accordance with an embodiment of the present invention. Blocks of flowchart 800 may be carried out by modules of a system (e.g., systems 100, 200, 400, and 500) for electronic sensing in a stringed instrument.

In block 802, a lighting element is illuminated. As described herein, the lighting element may be illuminated based on a signal received for a computer device (e.g., MIDI signal) and the lighting may be for instructional purposes.

In block 804, a first signal is received from a peak detection circuit. As described herein, the peak detection circuit may be operable to sense string activation. In one embodiment, the string activation may be detected via capacitive sensors. In another embodiment, the string activation is optically detected.

In block 806, a second signal from one or more capacitive sensors is received. The second signal may be received from one or more capacitive sensor readings and include finger placement information.

In block 808, a third signal is received from a capacitive sensor based on a tremolo bar device. As described herein, tremolo input may be received via a capacitive sensor based tremolo device.

In block 810, the signals are processed. The processing can include processing the first, second, and third signals received to generate an audio signal (e.g., MIDI output via MIDI library 811). In addition, the processing can include adjusting the audio signal to reflect a capo or a tuning configuration. It is appreciated that the tuning settings allow instant reconfiguration of the instrument thereby removing the need to have separate custom tuned instruments (e.g., other guitars). The tuning may be changed via the instruments interface (e.g., knobs, buttons, capacitive based interface, or display screen).

The processing may further include detecting various tone modification techniques including, but not limited to, pitch bends, vibrato, pizzicato, harmonics, hammer-on, pull-off, slides, and plucking nuances. As described herein, the processing can include detecting vibrato based on varying pressure applied to a capacitive sensor. Pitch bend may be detected based upon movement of a finger across a portion of the plurality of capacitive sensors.

Hammer-ons may be detected based on an increase in capacitance. Hammer-ons can be detected by monitoring a rapid increase in capacitance for a single capacitive element, as well as a significant amplitude of capacitive change. Hammer-ons may be detected based on being characterized by how quickly the capacitance ramped up with the finger hitting it.

Pull-offs may be detected based on a decrease in capacitance. Pull-offs can be detected by monitoring a rapid decrease in capacitance for a single capacitive sensor element. In one embodiment, pull-off detection is coupled with vibration because vibration of the string is often characteristic of a pull-off. Pull-offs can also be detected by monitoring neighboring string capacitive sensors to determine if the player is pulling the string sideways as part of the pull-off. Pull-offs may further be detected as the finger is dragged off a string. For example, if a finger is on string two and if the finger is partially pulled off but drags off of string one, the capacitive sensors will measure a rapid decrease in capacitance on string two.

A slide may be detected based on sequential changes in a portion of the plurality of capacitive sensors. More specifically, slides can be detected and implemented as an altering pitch by detecting when the finger position sequentially changes between neighboring fret positions while the string is activated, meaning the amplitude is detected by the string activation sensing circuit. That is, a slide can be detected as plucking of a string and then detecting the finger sliding up substantially all the fret positions.

In block 812, an audio signal is output. In one embodiment, the audio signal output is a MIDI signal. The audio signal may be output by a variety of means including, but not limited to, wireless Universal Serial Bus (USB). The audio signal may be output to a variety of devices including, but not limited to, an amplifier or a computing system.

Thus, embodiments of the present invention provide a way for electronically sensing finger placement and string activation for producing an audio signal for output. A realistic instrument playing experience is facilitated while avoiding the pain associated with learning the guitar. Embodiments of the present invention are well suited for use in education, providing interactive instruction, composing music, and recording.

Embodiments of the present invention are thus described. While the present invention has been described in particular embodiments, it should be appreciated that the present invention should not be construed as limited by such embodiments, but rather construed according to the below claims.

What is claimed is:

1. A method for electronic sensing of stringed instrument input, the method comprising:
   receiving first signals from a peak detection circuit, wherein said peak detection circuit is operable to sense string activation of said instrument;
   receiving second signals from a first capacitive sensor and a second capacitive sensor located on a neck of said instrument, the first capacitive sensor and the second capacitive sensor overlapping across an axis between the first capacitive sensor and the second capacitive sensor, wherein said second signals comprise finger placement information;
   processing said first and said second signals to generate an audio signal therefrom; and
   electronically rendering said audio signal to produce an audible output of the stringed instrument input.

2. The method of claim 1 further comprising:
   receiving third signals from a capacitive sensor based tremolo bar device, wherein said processing further comprises processing said first signals, said second signals, and said third signals to generate said audio signal.

3. The method of claim 1 further comprising string activation detecting capacitive sensors located on said instrument.

4. The method of claim 1, further comprising string activation detecting optical sensors located on said instrument.

5. The method of claim 1 further comprising receiving a capo setting and wherein said processing comprises adjusting said audio signal to reflect a capo.

6. The method of claim 1 further comprising receiving a tuning configuration and wherein said processing comprises adjusting said audio signal to reflect said tuning configuration of said instrument.

7. The method of claim 1 wherein said processing comprises detecting vibrato based on varying pressure applied to a capacitive sensor.

8. The method of claim 1 wherein said processing comprises detecting pitch bend based upon movement of a finger across a portion of the sensing area.

9. The method of claim 1 wherein said processing comprises detecting hammer on based on an increase in capacitance.

10. The method of claim 1 wherein said processing comprises detecting pull-off based on a decrease in capacitance.

11. The method of claim 1 wherein said processing comprises detecting a slide based on sequential changes in the first capacitive sensor and the second capacitive sensor.

12. An electronic system to provide electronic sensing in a stringed instrument, said electronic system comprising:
   a string activation module configured to sense string activation of said instrument;
   a capacitive sensor module configured to capacitively sense finger positions along a plurality of fret positions and a plurality of stings; and
   a processing module configured to receive signals from said string activation module and said capacitive sensor module, wherein said processing module is further configured to output an audio signal to be electronically rendered as an audible output of the stringed instrument, wherein a neck portion of the stringed instrument comprises a first capacitive sensor and a second capacitive sensor that overlap across an axis between the first capacitive sensor and the second capacitive sensor, wherein the capacitive sensor module detects the finger positions via the first capacitive sensor and the second capacitive sensor.

13. The system of claim 12, wherein said string activation module is operable to detect string activation optically.

14. The system of claim 12, wherein said processing module is coupled to a tremolo bar input device.

15. The system of claim 12 further comprising a first plurality of capacitive sensors disposed in a strumming area of said instrument, wherein said string activation module senses string activation via said first plurality of capacitive sensors.

16. The system of claim 12, wherein said processing module outputs said audio signal based on a capo setting.

17. The system of claim 12, wherein said processing module is operable to detect vibrato and pitch bend.

18. A musical apparatus comprising:
   a neck portion comprising a plurality of capacitive sensors, the capacitive sensors configured to indicate finger positions across a plurality of frets and a plurality of strings, wherein adjacent capacitive sensors, of the plurality of capacitive sensors, overlap across an axis between adjacent capacitive sensors;
   a body portion comprising an activation area; and
   a processing component operable to receive signals from said plurality of capacitive sensors and said activation area, wherein said processing component processes said signals from said plurality of capacitive sensors and said activation area to produce an audio signal to be electronically rendered as an audible output of the musical apparatus.

19. The musical apparatus of claim 18, wherein said body portion further comprises a plurality of capacitive sensors operable to receive tremolo bar input.

* * * * *